(12) United States Patent
Major

(10) Patent No.: US 7,921,640 B2
(45) Date of Patent: Apr. 12, 2011

(54) EXHAUST GAS WASTE HEAT RECOVERY

(75) Inventor: Gregory A. Major, Farmington Hills, MI (US)

(73) Assignee: GM Global Technology Operations, LLC

( * ) Notice: Subject to any disclaimer, the term of this patent is extended or adjusted under 35 U.S.C. 154(b) by 656 days.

(21) Appl. No.: 11/956,361

(22) Filed: Dec. 14, 2007

(65) Prior Publication Data

US 2009/0151342 A1 Jun. 18, 2009

(51) Int. Cl.
*F01N 3/02* (2006.01)

(52) U.S. Cl. ............ 60/320; 60/274; 60/275; 60/298; 60/321; 422/271; 422/174; 422/175; 165/51; 165/52

(58) Field of Classification Search ............... 60/274, 60/298, 300, 320, 321, 275; 422/171, 173, 422/174, 175; 165/51, 52
See application file for complete search history.

(56) References Cited

U.S. PATENT DOCUMENTS

| | | | | |
|---|---|---|---|---|
| 5,450,721 A | * | 9/1995 | Golben et al. | 60/274 |
| 5,477,676 A | * | 12/1995 | Benson et al. | 60/274 |
| 5,653,106 A | * | 8/1997 | Katashiba et al. | 60/300 |
| 6,128,898 A | | 10/2000 | Sakurai et al. | |
| 6,203,764 B1 | | 3/2001 | Benson | |
| 6,318,077 B1 | * | 11/2001 | Claypole et al. | 60/303 |
| 6,875,407 B1 | * | 4/2005 | Biel et al. | 422/179 |
| 6,951,099 B2 | * | 10/2005 | Dickau | 60/300 |

* cited by examiner

*Primary Examiner* — Binh Q. Tran

(57) ABSTRACT

An exhaust heat recovery heat exchanger assembly for use along a main exhaust flow path of an exhaust system for an engine, and a method of operation, is disclosed. The exhaust heat recovery heat exchanger includes a sealed vacuum chamber, including a hydride pellet mounted in the chamber, and electrical leads extending from the hydride pellet. An exhaust chamber along the main exhaust flow path is located along an inner wall of the vacuum chamber. A housing surrounds the vacuum chamber and defines a heat receiving medium chamber. A heat receiving medium flows through the heat receiving medium chamber and absorbs heat from the exhaust flowing through the exhaust chamber when an electric current is applied to the hydride pellet.

17 Claims, 3 Drawing Sheets

US 7,921,640 B2

EXHAUST GAS WASTE HEAT RECOVERY

BACKGROUND OF INVENTION

The present invention relates generally to waste heat recovery and use of recovered waste heat from a fluid such as the exhaust of a vehicle engine.

When operating an internal combustion engine, a significant portion of the energy from the combustion is wasted as heat in the exhaust gasses expelled to atmosphere. Some have proposed systems for recovering exhaust gas waste heat in vehicles, such as transferring exhaust gas heat to engine coolant. However, there may be certain operating conditions where this is not desirable. For example, heat transfer may be undesirable if additional heat transfer may cause the liquid to boil, in which case the powertrain cooling system would need to have a higher capacity (larger radiator and fan) to prevent this.

Accordingly, some have suggested vehicle systems to allow for selectively transferring heat from the exhaust gasses to the engine coolant. For example, some vehicle exhaust systems include bypass pipes that run in parallel with a portion of the main exhaust gas stream, with flow control valves in the exhaust system to direct the flow. The flow control valves selectively redirect exhaust gas from main gas stream, through the separate bypass pipes that run in parallel with the main gas stream, and back into the main exhaust stream after passing through a heat exchanger. The heat exchanger in the bypass pipes transfers heat from the exhaust gasses to engine coolant that is directed through the heat exchanger. In this way, heat can be transferred to the engine coolant when desired. When heat transfer from the exhaust is not desired, the valves are actuated to direct the exhaust gas straight through exhaust system, bypassing the bypass pipes and heat exchanger. But such systems require additional package space for bypass pipes and heat exchangers as well as valves (and actuators for the valves) for redirecting the flow. Moreover, by diverting the exhaust gasses, there may be undesirable pressure drop variations in the exhaust system or undesirable changes in exhaust back pressure when switching from one flow path to another.

SUMMARY OF INVENTION

An embodiment contemplates an exhaust heat recovery heat exchanger assembly for use along a main exhaust flow path of an exhaust system for a vehicle having an engine. The exhaust heat recovery heat exchanger may comprise a vacuum chamber, including an inner wall and an outer wall, a hydride pellet mounted in the chamber, and a heating element operatively engaging the hydride pellet. Electrical leads extend from the vacuum chamber and are configured to attach to a source of electric current. The heat exchanger may also include an exhaust chamber within the inner wall, with the exhaust chamber being a portion of the main exhaust flow path. The heat exchanger may include a housing surrounding the outer wall and defining a heat receiving medium chamber between the housing and the outer wall, an inlet configured to receive and direct a heat receiving medium into the heat receiving medium chamber, and an outlet configured to receive and direct the heat receiving medium from the heat receiving medium chamber.

An embodiment contemplates a vehicle having an engine, and an engine exhaust system operatively engaging the engine to direct exhaust gasses away from the engine along a main exhaust flow path. The engine exhaust system includes an intermediate pipe configured to direct exhaust gasses along the main flow path. The vehicle also includes an exhaust heat recovery heat exchanger having a sealed vacuum chamber, including an inner wall and an outer wall, a hydride pellet mounted in the chamber, and a heating element operatively engaging the hydride pellet. Electrical leads extend from the heating element to outside of the vacuum chamber. An exhaust chamber within the inner wall forms a portion of the main exhaust flow path. A housing surrounds the outer wall and a heat receiving medium chamber is defined between the housing and the outer wall. The housing has an inlet configured to receive and direct a heat receiving medium into the heat receiving medium chamber, and an outlet configured to receive and direct the heat receiving medium from the heat receiving medium chamber.

An embodiment contemplates a method of selectively absorbing waste heat from exhaust gasses flowing through a main flow path of an exhaust system for a vehicle having an engine, the method comprising the steps of: operating the engine, thereby causing exhaust gasses to flow through an exhaust chamber along the main flow path; flowing a heat receiving medium through a heat receiving chamber surrounding the exhaust chamber; providing a sealed vacuum chamber between the heat receiving chamber and the exhaust chamber; determining if heat transfer from the exhaust gasses to the heat receiving medium is desired; and applying an electric current to a heating element operatively engaging a hydride pellet in the vacuum chamber to thereby release hydrogen in the vacuum chamber when it is determined that heat transfer from the exhaust gasses to the heat receiving medium is desired.

An advantage of an embodiment is that faster engine warm up is achieved, which may improve fuel economy and vehicle emissions.

An advantage of an embodiment is that faster warming of a passenger cabin is achieved.

An advantage of an embodiment is that thermal transfer from the exhaust gasses to the engine coolant can be prevented when thermal input to the coolant is not desired. This is also accomplished with a relatively small package size in order to avoid interference with other vehicle components. Moreover, no moving parts are required for switching between a mode for transferring heat from the exhaust gasses to the engine coolant and one where heat transfer is prevented. This may lead to improved quality.

An advantage of an embodiment is that there is no pressure drop variation or other backpressure variation in the exhaust system when switching between a heat transfer mode and a non-heat transfer mode.

DETAILED DESCRIPTION

Figure 1:
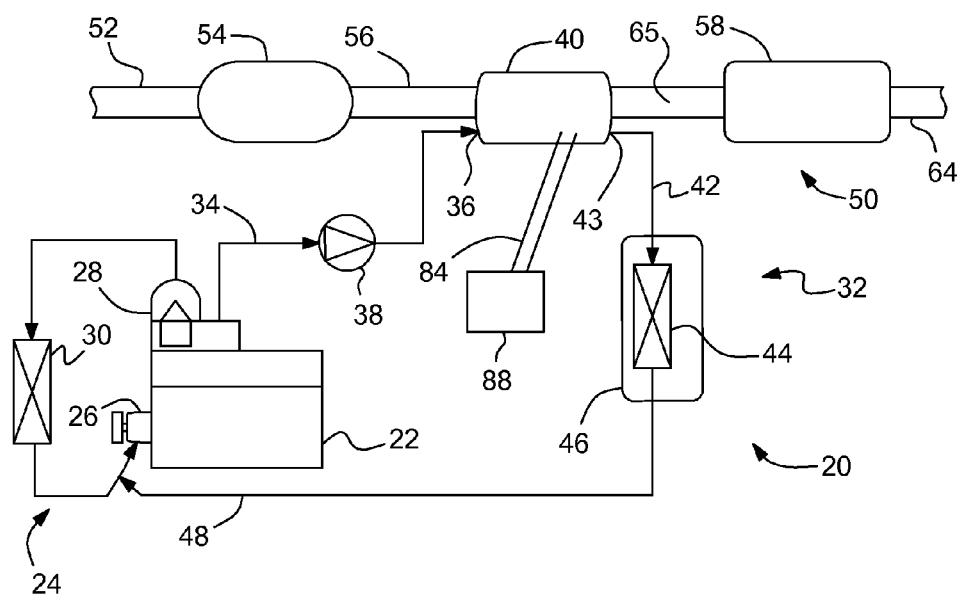
FIG. 1 is a schematic drawing of a vehicle having an exhaust gas waste heat recover system.
Figure 2:
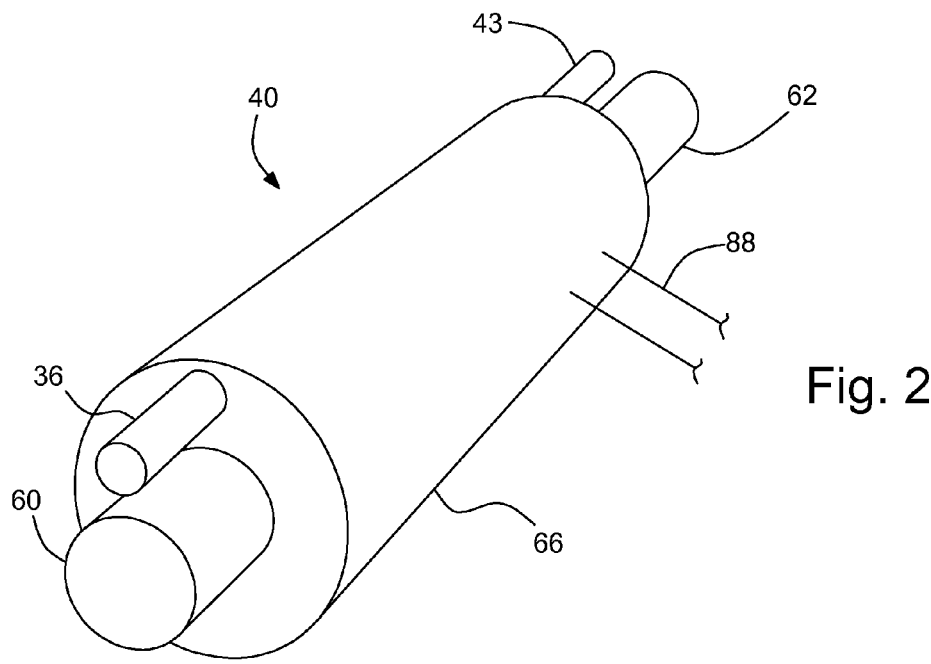
FIG. 2 is a schematic, perspective view of a portion of the exhaust gas waste heat recovery system
Figure 3:
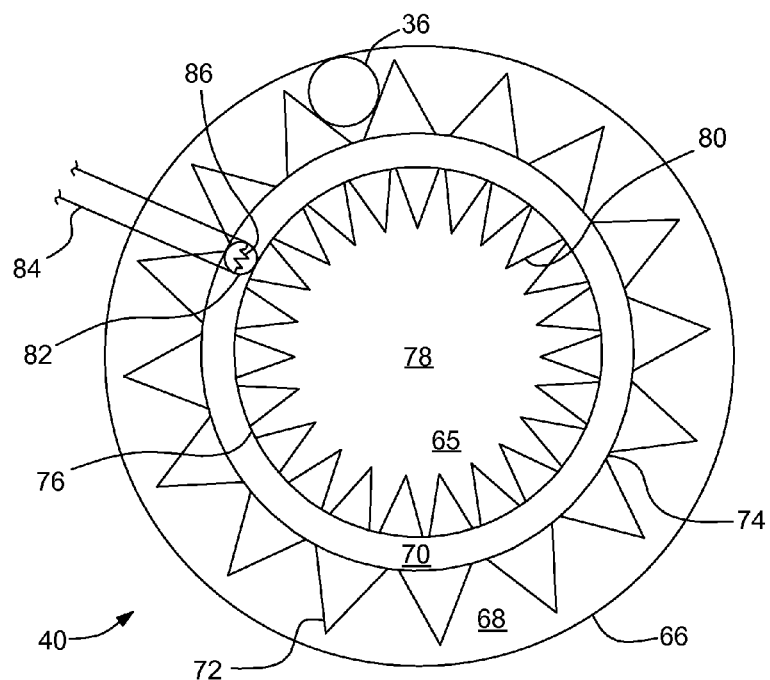
FIG. 3 is a schematic, cross sectional view of an exhaust heat recovery heat exchanger.

Referring to FIGS. 1-3, a portion of a vehicle, indicated generally at 20, is shown. The vehicle 20 includes an internal combustion engine 22 having an engine cooling system 24 including a water pump 26, which may be engine driven, for pumping coolant through the system 24. A thermostat 28 selectively allows or blocks coolant flow through a radiator 30. These components may be conventional and so will not be discussed in more detail herein.

Coolant is also used for providing heat in a heating, ventilation and air conditioning (HVAC) system 32. A coolant conduit 34 directs coolant from the engine 22 to a coolant inlet 36 of an exhaust heat recovery heat exchanger 40. An optional electric pump 38 may be located along the coolant conduit 34 and used to pump coolant when the engine is off. Such an electric pump 38 may be desirable, for example, when the vehicle is a hybrid electric vehicle that operates at times with the engine 22 off. A second coolant conduit 42 directs coolant from a coolant outlet 43 of the heat exchanger 40 to a heater core 44 in a HVAC module 46, and a third coolant conduit 48 directs coolant from the heater core 44 back to the engine cooling system 24.

An engine exhaust system 50 receives exhaust from the engine 22 in a conventional fashion. The exhaust system 50 includes an exhaust pipe 52 upstream of an exhaust treatment assembly, such as a catalytic converter 54. An intermediate exhaust pipe 56 extends downstream from the catalytic converter 54. The intermediate exhaust pipe 56 may have an upstream portion that extends from the catalytic converter 54 to an exhaust inlet 60 on the heat exchanger 40 and a downstream portion that extends from an exhaust outlet 62 to a muffler 58. Or, alternatively, the intermediate exhaust pipe 56 may extend through and form a part of the heat exchanger 40, connecting at a downstream end to the muffler 58. A tailpipe 64 may extend from the muffler 58 and direct the exhaust to atmosphere. The exhaust system 50 may include other conventional exhaust system components instead or in addition to the conventional exhaust components discussed in this embodiment. In any event, heat exchanger 40 is located along a main exhaust flow path 65 through which the exhaust gasses pass.

The exhaust heat recovery heat exchanger 40 includes a housing 66 surrounding and forming an outer wall of a chamber for receiving heat from the exhaust, such as a coolant chamber 68. The coolant inlet 36 and coolant outlet 43 direct coolant into and out of, respectively, the coolant chamber 68. An inner wall of the coolant chamber 68 is formed by an outer wall 74 of a vacuum chamber 70. Coolant heat transfer fins 72 may extend outward from the outer vacuum chamber wall 74 to increase the heat transfer area in the coolant chamber 68. An inner wall 76 of the vacuum chamber 70 defines an exhaust chamber 78 (through which the main exhaust flow path 65 extends). The inner wall 76 may be a separate part of the heat exchanger 40, or alternatively, if the intermediate exhaust pipe 56 extends through the heat exchanger 40, the inner wall 76 may be formed by the intermediate exhaust pipe 56 itself. Exhaust heat transfer fins 80 extend inward from the inner wall 76 to increase heat transfer area in the exhaust chamber 78.

At least one hydride pellet 82 is located in the vacuum chamber 70. Electrical leads 84 connect to a resistor 86 (or other electrical element that generates heat when an electric current is passed through it). The electrical leads 84 extend out through the housing 66 and are electrically coupled to a controller 88. The controller 88 may be separate, or part of another vehicle controller, and selectively supplies electric current to the leads 84.

The operation of the systems within the vehicle 20 of FIGS. 1-3 will now be discussed. Under vehicle operating conditions when the engine coolant is warmed-up to its operating temperature and the engine 22 is operating, the thermostat 28 is open and the water pump 26 pumps coolant through the radiator 30 and heater core 44. If heating of a passenger cabin (not shown) is requested, then the HVAC module 46 directs air flow through the heater core 44. Of course, the exhaust gasses from the engine 22 will flow through the exhaust system 50 and out of the tailpipe 64 to atmosphere. In this condition, the controller 88 does not send an electric current through the leads 84. With no current to the leads 84, the hydride pellet 82 retains its hydrogen, thus causing the vacuum in the vacuum chamber 70 to act as an insulator. Consequently, there is little or no heat transfer from the exhaust gasses to the coolant.

If, on the other hand, the engine coolant is cold and the engine is operating, the thermostat 28 is closed and the controller 88 sends an electric current through the leads 84 (and hence resistor 86). With the thermostat closed, coolant will not flow through the radiator 30 to cool the already cold coolant. Also, the heat generated in the resistor 86 will cause the hydride pellet to release hydrogen into the vacuum chamber 70, thus turning the vacuum chamber 70 from a thermal insulator to a thermal conductor. Heat in the exhaust gasses flowing through the exhaust chamber 78 will transfer through the vacuum chamber 70 and into the coolant in the coolant chamber 68. The coolant heat transfer fins 72 and exhaust heat transfer fins 80 provide a greater surface area for increasing the rate of heat transfer from the exhaust to the coolant. The coolant flowing from the exhaust heat recovery heat exchanger 40 will be warmer when it flows into the heater core 44, allowing for faster warm-up of the passenger cabin. Also, the warmer coolant will flow from the heater core 44 back to the engine 22, thus allowing for faster engine warm-up as well. Once the coolant reaches a desired temperature, the controller 88 stops the current to the leads 84, which will cause the hydride pellet 82 to reabsorb the hydrogen from the vacuum chamber 70, making the vacuum chamber 70 and insulator again.

One will note that, under both of the operating conditions discussed, the flow path and the back pressure for the engine exhaust does not change—the exhaust gasses flow through the heat exchanger 40 along the same main exhaust flow path 65 no matter what the operating condition. And, there are no moving parts (no valves, etc.) that are employed to switch between a heat transfer condition and a non-heat transfer condition.

The optional electric pump 38 may be employed when the coolant is warmed-up and the vehicle 20 is operating without the engine 22 operating (as may be the case with hybrid vehicles). In this case, the electric pump 38 can keep coolant pumping through the heater core 44 in order to provide heat to the passenger cabin. The electric current to the leads 84 may remain off since no exhaust is flowing through the exhaust system 50.

Figure 4:
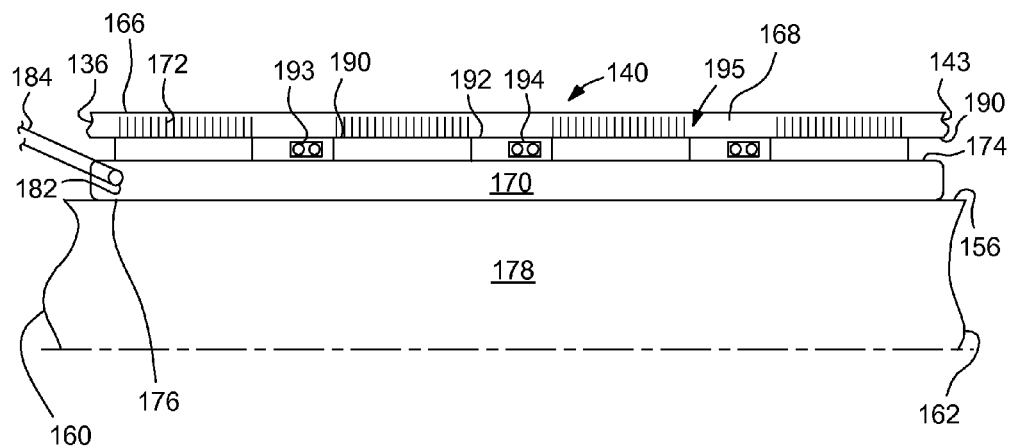
FIG. 4 is a schematic, section view of an exhaust heat recovery heat exchanger according to a second embodiment.

FIG. 4 illustrates a second embodiment. Since this embodiment is similar to the first, similar element numbers will be used for similar elements, but employing 100-series numbers.

In this embodiment, the intermediate exhaust pipe 156 forms or connects to the inner wall 176 of the vacuum chamber 170 to define the exhaust chamber 178 between the exhaust inlet 160 and the exhaust outlet 162 of the exhaust heat recovery heat exchanger 140. The vacuum chamber 170 is formed between the inner wall 176 and outer wall 174, with the hydride pellet 182 mounted therein and connected to electrical leads 184. The housing 166 forms an outer wall of a coolant chamber 168, between the coolant inlet 136 and coolant outlet 143, with coolant heat transfer fins 172 for increasing the surface area for heat transfer.

Unlike the first embodiment, this embodiment includes components between the outer wall 174 of the vacuum chamber 170 and an inner wall 190 of the coolant chamber 168. Thermoelectric devices 191 alternate with pockets of insulating material 192 and high temperature electrical conductors 193 in potting material 194 to create an electrical power generating assembly 195. The potting material 194 helps protect the electrical conductors 193 from the heat, while the insulation may be employed to reduce the heat transfer directly to the coolant (rather than through the thermoelectric devices 191). The thermoelectric devices 191 are oriented to have their hot sides facing the exhaust chamber 178 and their cold sides facing the coolant chamber 168.

When no heat transfer from the exhaust gasses is desired, the operation is the same as with the first embodiment. No electric current is supplied to the electric leads 184, so the hydride pellet 182 retains the hydrogen, making the vacuum chamber 170 act as an insulator. Also, when heat transfer is desired, electric current is passed through the leads 184, heating the resistor (not shown in this embodiment), causing the hydride pellet 182 to release hydrogen into the vacuum chamber 170. With the vacuum chamber 170 filled with hydrogen, heat readily transfers from the exhaust flowing through the exhaust chamber 178, through the vacuum chamber 170, the thermoelectric devices 191, and into the coolant flowing through the coolant chamber 168. As the heat passes through the thermoelectric devices 191, electricity is generated. Thus, this embodiment includes electricity generation in addition to the coolant heating discussed in the first embodiment. In this embodiment, the vacuum chamber 170 is used to limit the heat transfer to the thermoelectric devices 191 to make sure that there is not too much for the thermoelectric devices 191 to handle.

Figure 5:
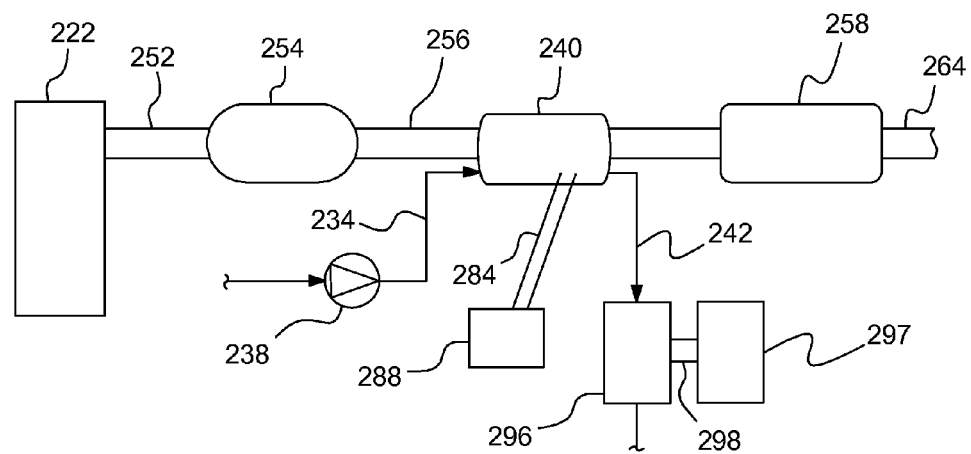
FIG. 5 is a schematic drawing of a portion of an exhaust gas waste heat recovery system according to a third embodiment.

FIG. 5 illustrates a third embodiment. Since this embodiment is similar to the first, similar element numbers will be used for similar elements, but employing 200-series numbers. The elements discussed in this embodiment may be used in a vehicle or in stationary equipment.

In this embodiment, an assembly 222 that produces hot waste fluids, such as, for example, an engine, produces the hot fluids, such as exhaust gasses, that are directed through the pipe 252, an optional exhaust (or other fluid) treatment assembly 254, intermediate pipe 256, exhaust heat recovery heat exchanger 240, and an optional muffler 258 and tailpipe 264 (if for an engine exhaust system). Alternatively, the assembly 222 may be, for example, fuel cells. In this embodiment, the conduit 234 leading into the heat exchanger 240 may carry water or refrigerant (or other heat absorbing fluid) that is then directed through the second conduit 242 to a machine 296 driven by the hot fluid, such as, for example, a turbine. The turbine 296 (or other device) may be connected to a second machine 297, such as, for example, a generator via a driven shaft 298. A controller 288 is still employed to supply electric current to the electrical leads 284, which are still connected to the hydride pellet (not shown in this embodiment) in the vacuum chamber (not shown in this embodiment). A pump 238 pumps fluid through the heat exchanger 240.

Again the application and removal of electric current to the hydride pellet controls the vacuum chamber acting as an insulator or heat transfer medium. In this embodiment, when the machine 296 is a turbine, the assembly 22 is an engine, and the controller 288 applies current to the leads 284, the heat transfer from the exhaust gasses to the fluid may be used to boil the fluid, which then drives the turbine 296. The turbine 296 then drives the generator 297 via the driven shaft 298. If this system is employed in a vehicle, then this additional electricity produced by the waste heat in the exhaust gasses may allow for a reduction in the size of the vehicle alternator (not shown).

As another alternative, the waste heat in the exhaust can be selectively transferred through the vacuum chamber to warm a medium that is used for battery heating in hybrid electric vehicles, or the heat may be selectively transferred to transmission oil to improve the warm-up and performance of a vehicle transmission (not shown).

While certain embodiments of the present invention have been described in detail, those familiar with the art to which this invention relates will recognize various alternative designs and embodiments for practicing the invention as defined by the following claims.

What is claimed is:

1. An exhaust heat recovery heat exchanger assembly for use along a main exhaust flow path of an exhaust system for a vehicle having an engine, the exhaust heat recovery heat exchanger comprising:
   a sealed vacuum chamber, including an inner wall and an outer wall, a hydride pellet mounted in the chamber, and a heating element operatively engaging the hydride pellet and including electrical leads extending from the vacuum chamber and configured to attach to a source of electrical current;
   an exhaust chamber defined by the inner wall, the exhaust chamber being a portion of the main exhaust flow path;
   a housing surrounding the outer wall and defining a heat receiving medium chamber between the housing and the outer wall, an inlet configured to receive and direct a heat receiving medium into the heat receiving medium chamber, and an outlet configured to receive and direct the heat receiving medium from the heat receiving medium chamber; and
   a thermoelectric device located between the outer wall and the heat receiving medium chamber and oriented to generate electricity when heat is transferred from the vacuum chamber to the heat receiving medium chamber.

2. The exhaust heat recovery heat exchanger assembly of claim 1 wherein the heat receiving medium is engine coolant, the inlet is connected to a first conduit configured to direct the engine coolant from the engine, and the outlet is connected to a second conduit configured to direct the engine coolant to a heater core in a HVAC module.

3. The exhaust heat recovery heat exchanger assembly of claim 1 including a plurality of heat transfer fins extending from the outer wall into the heat receiving medium chamber.

4. The exhaust heat recovery heat exchanger assembly of claim 1 including a plurality of exhaust heat transfer fins extending from the inner wall into the exhaust chamber.

5. The exhaust heat recovery heat exchanger assembly of claim 1 wherein the source of electric current is a controller connected to the electrical leads, and the heating element is a resistor.

6. A vehicle comprising:
   an engine;
   an engine exhaust system operatively engaging the engine to direct exhaust gasses away from the engine along a main exhaust flow path, the engine exhaust system including an intermediate pipe configured to direct exhaust gasses along the main flow path;
   an exhaust heat recovery heat exchanger having a sealed vacuum chamber, including an inner wall and an outer wall, a hydride pellet mounted in the chamber, and a heating element operatively engaging the hydride pellet and including electrical leads extending from the vacuum chamber; an exhaust chamber within the inner wall that forms a portion of the main exhaust flow path;
a housing surrounding the outer wall and defining a heat receiving medium chamber between the housing and the outer wall, an inlet configured to receive and direct a heat receiving medium into the heat receiving medium chamber, and an outlet configured to receive and direct the heat receiving medium from the heat receiving medium chamber; and
a conduit connected between the outlet and a turbine to thereby direct the heat receiving medium to the turbine, with the turbine being drivingly connected to a generator.

7. The vehicle of claim 6 wherein the heat receiving medium is a refrigerant.

8. The vehicle of claim 6 wherein the engine exhaust system includes a catalytic converter and a muffler, and the exhaust chamber is located downstream of the catalytic converter and upstream of the muffler.

9. The vehicle of claim 6 wherein the heat receiving medium is engine coolant, and the vehicle includes a first conduit connected between an electric pump and the inlet, and a second conduit connected between the outlet and a heater core in a HVAC module.

10. The vehicle of claim 6 including a plurality of heat transfer fins extending from the outer wall into the heat receiving medium chamber.

11. The vehicle of claim 6 including a plurality of exhaust heat transfer fins extending from the inner wall into the exhaust chamber.

12. The vehicle of claim 6 including a controller operatively engaging the electrical leads to thereby selectively supply electric current to the leads.

13. The vehicle of claim 6 including a thermoelectric device located between the outer wall and the heat receiving medium chamber and oriented to generate electricity when heat is transferred from the vacuum chamber to the heat receiving medium chamber.

14. A method of selectively absorbing waste heat from exhaust gasses flowing through a main flow path of an exhaust system for a vehicle having an engine, the method comprising the steps of:
    (a) operating the engine, thereby causing exhaust gasses to flow through an exhaust chamber along the main flow path;
    (b) flowing a heat receiving medium through a heat receiving chamber surrounding the exhaust chamber;
    (c) providing a sealed vacuum chamber between the heat receiving chamber and the exhaust chamber;
    (d) determining if heat transfer from the exhaust gasses to the heat receiving medium is desired;
    (e) applying an electric current to a heating element operatively engaging a hydride pellet in the vacuum chamber to thereby release hydrogen in the vacuum chamber when it is determined that heat transfer from the exhaust gasses to the heat receiving medium is desired; and
    (f) providing a thermoelectric device between the sealed vacuum chamber and the heat receiving chamber; and
    (g) applying an electric current to the heating element operatively engaging a hydride pellet in the vacuum chamber to thereby release hydrogen in the vacuum chamber when it is determined that electricity generation from the thermoelectric device is desired.

15. The method of claim 14 wherein the heat receiving medium is engine coolant, and the method further includes the step of flowing the engine coolant from the heat receiving chamber to a heater core in a HVAC module.

16. The method of claim 14 including steps (h) heating the heat receiving medium to a gas phase, and (i) directing the gas through a turbine.

17. A waste heat recovery heat exchanger for use along a heated fluid flow path directed from an assembly that produces a heated fluid with waste heat, the waste heat recovery heat exchanger comprising:
a sealed vacuum chamber, including an inner wall and an outer wall, a hydride pellet mounted in the chamber, and a heating element operatively engaging the hydride pellet and including electrical leads extending from the vacuum chamber and configured to attach to a source of electrical current;
a heated fluid chamber defined by the inner wall, the heated fluid chamber being a portion of the heated fluid flow path;
a housing surrounding the outer wall and defining a heat receiving medium chamber between the housing and the outer wall, an inlet configured to receive and direct a heat receiving fluid into the heat receiving medium chamber, and an outlet configured to receive and direct the heat receiving fluid from the heat receiving medium chamber; and
a conduit connected between the outlet and a turbine to thereby direct the heat receiving medium to the turbine, with the turbine being drivingly connected to a generator.

* * * * *